July 6, 1965
H. LE ROY OLIVER
3,192,981
BARREL NUT
Filed Oct. 3, 1962
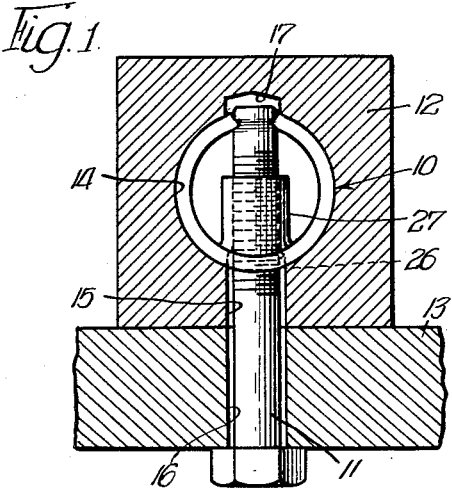
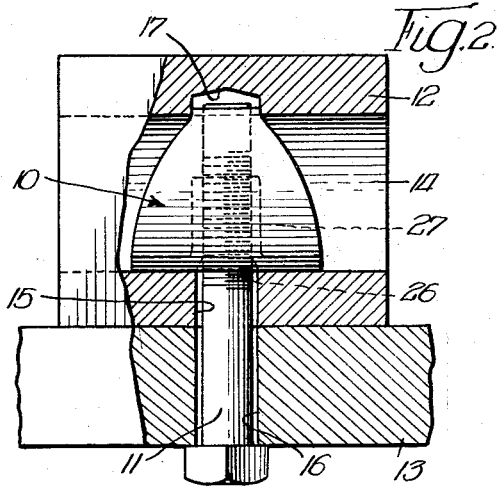
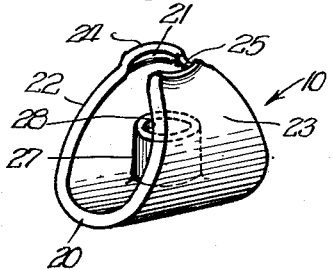
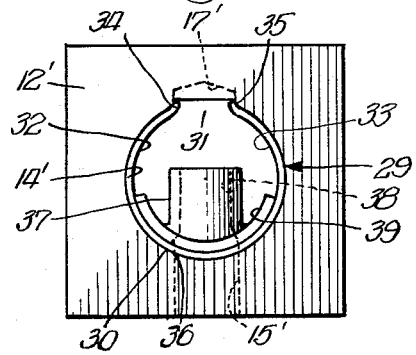
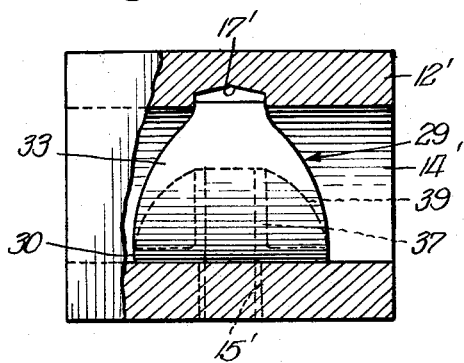
INVENTOR.
Harold L. Oliver,
BY
Cromwell, Greist + Warden
attys.

United States Patent Office 3,192,981
Patented July 6, 1965

3,192,981
BARREL NUT
Harold Le Roy Oliver, 3845 Ver Halen Court,
Culver City, Calif.
Filed Oct. 3, 1962, Ser. No. 228,056
3 Claims. (Cl. 151—41.75)

This invention relates to connecting and fastening devices and more particularly to a new and improved barrel nut.

Barrel nuts are used in the aircraft industry and in other industries where it is either impractical or undesirable to have the nut of a bolt exposed at the surface of the installation. Barrel nuts, which are usually characterized by a solid body member having a cylindrical portion with a transversely disposed interiorly threaded bore therein, have been provided in response to this problem. Barrel nuts are installed in a cylindrical opening which is formed in one of the members to be connected, which cylindrical opening intersects a bolt receiving bore. The barrel nut is inserted in the cylindrical opening until the interiorly threaded bore of the nut is in alignment with the bolt receiving bore. A bolt is then inserted in the bolt receiving bore and threadingly engaged with the barrel nut disposed in the cylindrical opening of the member forming a part of the bolted connection. Manifestly, it is desirable to provide some means to retain the barrel nut in the cylindrical opening with the threaded opening therein in alignment with the bolt receiving bore. Such retaining means have been provided by those skilled in the art, and such retaining means usually include a separate clip or the like engageable with a flat face on the barrel nut and with the surface of the cylindrical opening for frictionally holding the barrel nut therein. Known retaining clips of this nature have not been found to be completely satisfactory. A major disadvantage of these clips resides in the fact that since they are separate from the barrel nut they must be assembled with the same prior to their installation with the barrel nut in the cylindrical opening. This requires an extra step in the assembly of each bolted connection which is obviously undesirable from the standpoint of low cost and efficiency. Further, because these known retaining clips and barrel nuts represent a two-piece assembly, it is often difficult to maintain the clip and the barrel nut in proper engagement as they are inserted in the cylindrical opening. Also, another disadvantage inherent in known retaining nut clips resides in the additional expense in fabricating a separate part to be used with the barrel nut for retaining the same in place.

Accordingly, it is the principal object of this invention to provide a new and improved barrel nut of unitary construction which will be easy to install and maintain in place in the cylindrical opening of one member of a structural installation.

It is a further object of this invention to provide a barrel nut of unitary construction having improved means for retaining its proper position in the cylindrical opening in a part in which it is used.

It is an even further object of this invention to provide a barrel nut of unitary construction which is light in weight having particular utility for use in making bolted connections in airframes.

It is a still further object of the present invention to provide a barrel nut of unitary construction which can be made from a minimum amount of material thereby having the attendant advantage of low cost manufacture.

These and other objects and advantages of the invention will become apparent from the following specification wherein like numerals refer to similar parts throughout.

In the drawings:

FIG. 1 is a section through a structural installation at a bolted connection therein showing the barrel nut in place in a cylindrical opening and threadingly engaged with a bolt;

FIG. 2 is a partially broken away view of FIG. 1 as seen from the right side thereof;

FIG. 3 is a perspective view of one form of the barrel nut of this invention;

FIG. 4 is an end view of a modification of the barrel nut of this invention showing the same in a cylindrical opening of a part of a bolted connection; and FIG. 5 is a partially broken away view of FIG. 4 as seen from the right side thereof.

FIG. 1 illustrates a typical installation showing the barrel nut of this invention, generally designated 10, threadingly engaged with a bolt 11 for connecting a first structural member 12 to a second structural member 13. A cylindrical opening 14 provided in the first structural member 12 intersects at a right angle a bolt receiving bore, which bolt receiving bore is formed by a bore 15 in the member 12 and by a bore 16 in the member 13. A bolt receiving bore extension 17 is provided in the structural member 12 co-axial with the bore 15 therein and intersected also by the cylindrical opening 14.

Referring especially to FIG. 3, the novel barrel nut 10 of this invention is seen to comprise a sleeve 20 which has a generally circular periphery for reception in the cylindrical opening 14. The ends of the sleeve are beveled toward an axially extending split or opening 21 in the wall of the sleeve for forming a pair of oppositely disposed generally semi-circular shaped retainer arms 22 and 23 which are tapered along their widths toward their distal ends. The arms 22 and 23 have an initial radius of curvature slightly greater than the radius of the particular cylindrical opening in which the barrel nut 10 is to be used, and the arms are adapted to be manually flexed into conformance with the curvature of the cylindrical opening for establishing a snug frictional engagement of the barrel nut with the cylindrical opening. The frictional engagement of these arms with the cylindrical opening retains the barrel nut within the structural member having the cylindrical opening. Outwardly projecting lips 24 and 25 are provided on the distal ends of the arms 22 and 23, respectively, which lips are adapted to engage the bolt receiving bore extension 17 when the barrel nut is in its proper position in the cylindrical opening. The lips act to assist in retaining the nut in the cylindrical opening as well as to align the same therein.

The sleeve 20 includes an aperture 26 in the wall thereof oppositely disposed from the split 21, which aperture is adapted for co-axial alignment with the bolt receiving bore when the barrel nut is inserted in the cylindrical opening in the part in which it is to be used. The barrel nut 10 includes a tubular portion 27 integral with the sleeve around the aperture 26 therein, which tubular portion extends radially inwardly from the sleeve for a distance less than the inside diameter of the sleeve. The tubular portion 27 has an axially extending threaded opening 28 therein which is co-axially aligned with the aperture 26 in the sleeve. It will be apparent that when the barrel nut is inserted in a cylindrical opening with the lips thereof in engagement with a bolt receiving bore extension, the interiorly threaded opening in the nut will be in alignment with the bolt receiving bore.

In FIGS. 4 and 5 a modification of the barrel nut of this invention is shown. The modified barrel nut functions in the same manner as the nut illustrated in FIGS. 1–3, and differs therefrom only in details of construction. The modified barrel nut, generally designated 29, comprises a sleeve 30 having a generally circular periphery adapted to be received in a cylindrical opening 14' of a structural member 12', which sleeve 30 has an axially extending split or opening 31 in the wall thereof for forming a pair of oppositely disposed generally semi-circular shaped retainer arms 32 and 33. The retainer arms 32 and 33 have an initial radius of curvature greater than the radius of the cylindrical opening 14' and are adapted to be manually flexed into conformance with the curvature of the cylindrical opening for establishing a snug frictional engagement along the same. The ends of the sleeve 30 are beveled in the same manner as the sleeve 20 thereby providing arms 32 and 33 which are tapered along their width toward the distal ends thereof. Outwardly projecting lips 34 and 35 are provided on the distal ends of the arms 32 and 33, respectively, which lips are adapted to engage a bolt receiving bore extension 17' co-axial with a bolt receiving bore 15' provided in the structural member 12'. The sleeve 30 also includes an aperture 36 in the wall thereof oppositely disposed from the split 31, which aperture is adapted to be aligned with the bolt receiving bore 15' in the structural member.

A tubular element 37 having an axially extending interiorly threaded opening 38 therein is adapted to be secured to the sleeve 30 for completing the modified form of the barrel nut 29. The tubular element 37 includes an annular flange 39 at one end thereof, which flange forms with the end of the element 37 an arcuate surface with a radius of curvature substantially the same as the radius of curvature of the inside of the sleeve 30. The tubular element 37 is secured to the inside of the sleeve 30 by any suitable means, such as by welding, brazing, etc., with the axially extending opening 38 therein in co-axial alignment with the aperture 36 in the sleeve 30, and the tubular element 37 is adapted to extend radially inwardly from the sleeve 30 for a distance less than the inside diameter thereof.

In the modified form of the invention illustrated in FIGS. 4 and 5, it will be noted that the sleeve 30 is shown with the wall thereof having a thickness substantially less than the thickness of the wall of the sleeve 20 illustrated in FIGS. 1-3. This reduction in thickness of the sleeve 30 is possible in the modified form of the invention due to the additional strength imparted to the barrel nut by the flange 39 which is secured to the inside of the sleeve 30 around the aperture 36 therein. It will be observed that the combined thickness of the flange 39 and the sleeve 30 is substantially the same as thickness of the sleeve 20 of the nut shown in FIGS. 1-3. Manifestly, the portions of the barrel nut subjected to the greatest strain are the tubular portion and the area of the sleeve adjacent the tubular portion. The distal end portions of the retainer arms need only be strong enough to properly retain the barrel nut in the cylindrical opening of the structural member in which the nut is to be used.

When it is desired to use the barrel nut of this invention, it is only necessary to manually flex the retainer arms thereof slightly inwardly allowing the barrel nut to be received within an appropriate cylindrical opening of a structural member. The barrel nut is maintained in the cylindrical opening by frictional engagement of the retainer arms with the opening. The interiorly threaded opening in the tubular portion of the barrel nut may be quickly and easily aligned with a bolt receiving bore by sliding the barrel nut in the cylindrical opening and rotating the same until the lips provided at the distal ends of the retainer arms snap into the bolt receiving bore extension which is co-axial with the bolt receiving bore. The engagement of the lips in the bolt extension bore assist in maintaining the barrel nut within the cylindrical opening of a structural member, and they align the barrel nut in a position where the threaded opening therein will be in co-axial alignment with the bolt receiving bore for proper reception of a bolt to be threadingly engaged with the barrel nut. The assembly of the barrel nut of this invention in a cylindrical opening in a structural member is very rapid because of the unitary construction of the barrel nut. Since the retainer arms are a part of the barrel nut, no assembly of the barrel nut with a separate retainer clip is necessary before the barrel nut is inserted in a cylindrical opening.

The barrel nut of this invention has another distinct advantage, especially advantageous in the aircraft industry, residing in its lightweight as compared with known barrel nuts. It will be obvious that the forming of the barrel nut of this invention from a sleeve having an inwardly extending tubular portion results in the construction of a barrel nut utilizing a minimum of material. The use of the modified form of the barrel nut of this invention results in an even greater saving of material, and accordingly a reduction of weight, in that the retainer arms of the modified form of the invention may be made quite thin. This is made possible by the provision of the flange at one end of the tubular element, which flange is secured against the inside of the relatively thin sleeve reenforcing the same at its area surrounding the aperture therein.

Thus it will be seen that by this invention a new and improved barrel nut has been provided. The barrel nut is of unitary construction which provides for its easy and rapid installation in a cylindrical opening in a part of a bolted structural installation. The barrel nut of this invention is strong, durable and yet made from a minimum of material thereby providing a nut of little weight which is advantageous in many industries and especially the aircraft industry. The barrel nut is easy and inexpensive to manufacture because of its unitary construction and because it may be made from a minimum of material.

While the invention has been shown in but one form it will be obvious to those skilled in the art that it is not to be so limited, but that it is susceptible of various changes and modifications without departing from the spirit and scope of the appended claims.

I claim:

1. In combination with a member having a cylindrical opening and an intersecting bolt receiving bore, a unitary barrel nut comprising a sleeve having a generally cylindrical periphery received in said cylindrical opening, which sleeve has an axially extending split in the wall thereof forming a pair of oppositely disposed generally semi-circular shaped retainer arms, said arms having an initial radius of curvature greater than the radius of said cylindrical opening and being adapted to be manually flexed into conformance with the curvature of the cylindrical opening for establishing a snug frictional engagement with the same, said sleeve having in the wall thereof an aperture oppositely disposed from said split and in co-axial alignment with said bolt receiving bore, said sleeve having a tubular portion secured thereto around the aperture therein and extending radially inwardly from said sleeve for a distance less than the inside diameter of the sleeve, said tubular portion having its outer wall surface in spaced relation with the inside surfaces of said retainer arms, and which tubular portion has an axially extending threaded opening therein in co-axial alignment with said aperture in said sleeve.

2. In combination with a member having a cylindrical opening and an intersecting bolt receiving bore, which bore has a co-axial extension intersected by said cylindrical opening, a unitary barrel nut comprising a sleeve having a generally cylindrical periphery received in said cylindrical opening, which sleeve has an axially extending split in the wall thereof forming a pair of oppositely disposed generally semi-circular shaped retainer arms, said arms having an initial radius of curvature greater than the radius of said cylindrical opening and being adapted to be manually flexed into conformance with the curvature of the cylindrical opening for establishing a snug frictional engagement with the same, said arms having on the distal ends thereof an outwardly projecting lip received in said extension, said sleeve having in the wall thereof an aperture oppositely disposed from said split and in co-axial alignment with said bolt receiving bore, said sleeve having a tubular portion secured thereto around the aperture therein and extending radially inwardly from said sleeve for a distance less than the inside diameter of the sleeve, said tubular portion having its outer wall surface in spaced relation with the inside surfaces of said retainer arms, and which tubular portion has an axially extended threaded opening therein in co-axial alignment with said aperture in said sleeve, whereby said sleeve is retained in said cylindrical opening with the threaded opening in said tubular portion in alignment with said bolt receiving bore by the engagement of said lips in said bore extension.

3. In combination with a member having a cylindrical opening and an intersecting bolt receiving bore, which bore has a co-axial extension intersected by said cylindrical opening, a unitary barrel nut comprising a sleeve having a generally cylindrical periphery received in said cylindrical opening, which sleeve has an axially extending split in the wall thereof forming a pair of oppositely disposed generally semi-circular shaped retainer arms, said arms having an initial radius of curvature greater than the radius of said cylindrical opening and being adapted to be manually flexed into conformance with the curvature of the cylindrical opening for establishing a snug frictional engagement with the same, said arms being tapered along their widths toward their distal ends and having on the distal ends thereof an outwardly projecting lip received in said extension, said sleeve having in the wall thereof an aperture oppositely disposed from said split and in co-axial alignment with said bolt receiving bore, a tubular element secured at one end thereof to the inside of said sleeve over the aperture therein and extending radially inwardly from said sleeve for a distance less than the inside diameter of the sleeve, which tubular element has an arcuate surface at said one end thereof with a radius of curvature substantially the same as the inside radius of said sleeve and an axially extending threaded opening therein in co-axial alignment with said aperture in said sleeve, said tubular portion having its outer wall surface in spaced relation with the inside surfaces of said retainer arms, whereby said sleeve is retained in said cylindrical opening with the threaded opening in said tubular element in alignment with said bolt receiving bore by the engagement of said lips in said bore extension.

References Cited by the Examiner

UNITED STATES PATENTS

| | | | |
|---|---|---|---|
| 571,042 | 11/96 | Edquist | 85—32 |
| 1,671,757 | 5/28 | Allen. | |
| 2,746,111 | 5/56 | Chvosta | 151—41.75 |
| 2,825,379 | 3/58 | Becker | 151—41.75 |
| 2,920,672 | 1/60 | Bronson | 151—41.76 |

EDWARD C. ALLEN, *Primary Examiner.*